United States Patent [19]

Youssef et al.

[11] Patent Number: 5,191,955
[45] Date of Patent: Mar. 9, 1993

[54] MULTI-STUD BRAKE FITTING

[75] Inventors: Hassan Youssef, Taverny; Yves Bigay, Versailles, both of France

[73] Assignee: Le Carbone Lorraine, Courbevoie, France

[21] Appl. No.: 696,126

[22] Filed: May 6, 1991

[30] Foreign Application Priority Data

May 18, 1990 [FR] France .................. 90 06601

[51] Int. Cl.⁵ .................. F16D 69/02; F16D 69/04; F16D 13/68
[52] U.S. Cl. .................. 188/251 A; 188/73.2; 192/107 M
[58] Field of Search .............. 188/73.1, 251 A, 251 R, 188/251 M, 255, 257, 258, 73.2; 419/8, 36; 192/107 M

[56] References Cited

U.S. PATENT DOCUMENTS

| | | | |
|---|---|---|---|
| 3,703,224 | 11/1972 | Bray | 188/251 M |
| 3,891,398 | 6/1975 | Odier | 188/251 M X |
| 3,937,303 | 2/1976 | Allen et al. | 188/251 R X |
| 3,946,192 | 3/1976 | Allen et al. | 419/8 X |
| 3,948,364 | 4/1976 | Lowey | 188/251 R |
| 4,119,179 | 10/1978 | Masclet | 188/73.2 |
| 4,278,153 | 7/1981 | Venkatu | 419/8 X |
| 4,344,795 | 8/1982 | Endo et al. | 199/251 A X |
| 4,415,363 | 11/1983 | Sanftleben et al. | 188/251 A X |
| 4,438,004 | 3/1984 | Myers | 188/251 R X |
| 4,501,347 | 2/1985 | Cerny et al. | 188/251 M X |
| 4,576,872 | 3/1986 | Ward | 419/8 X |
| 4,742,948 | 5/1988 | Fisher et al. | 188/251 A X |
| 4,770,283 | 9/1988 | Pütz et al. | 192/107 M |
| 4,799,579 | 1/1989 | Myers et al. | 188/250 G X |
| 4,940,565 | 7/1990 | Müller | 419/8 |

FOREIGN PATENT DOCUMENTS

| | | | |
|---|---|---|---|
| 144464 | 6/1985 | European Pat. Off. | |
| 153180 | 1/1956 | Sweden | 188/73.2 |

Primary Examiner—Matthew C. Graham
Assistant Examiner—Alfred Muratori
Attorney, Agent, or Firm—Dennison, Meserole, Pollack & Scheiner

[57] ABSTRACT

A brake fitting comprising a plurality of studs separated from each other by spaces, each stud made of a sintered friction product laterally sheathed by a less fragile sintered metal bead which extends into the spaces between the studs. The fitting further comprises a metal support having a surface on which the studs are fixed, the surface of the metal support being coated by grains of a braze-welding powder which are diffusion bonded thereto. The studs are continuously welded at their base portions to the coated metal support surface.

8 Claims, 2 Drawing Sheets

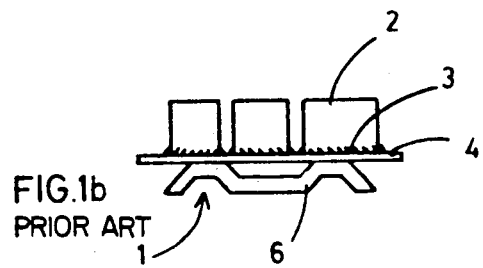
FIG.1b PRIOR ART
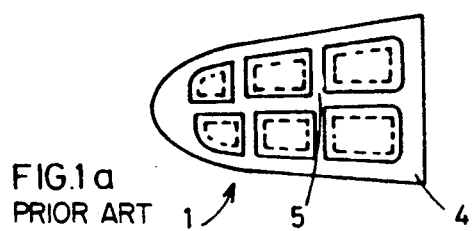
FIG.1a PRIOR ART
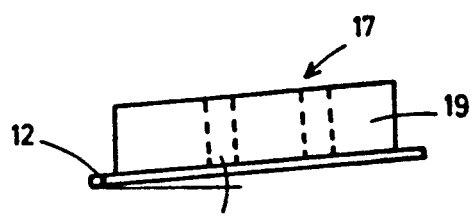
FIG.3
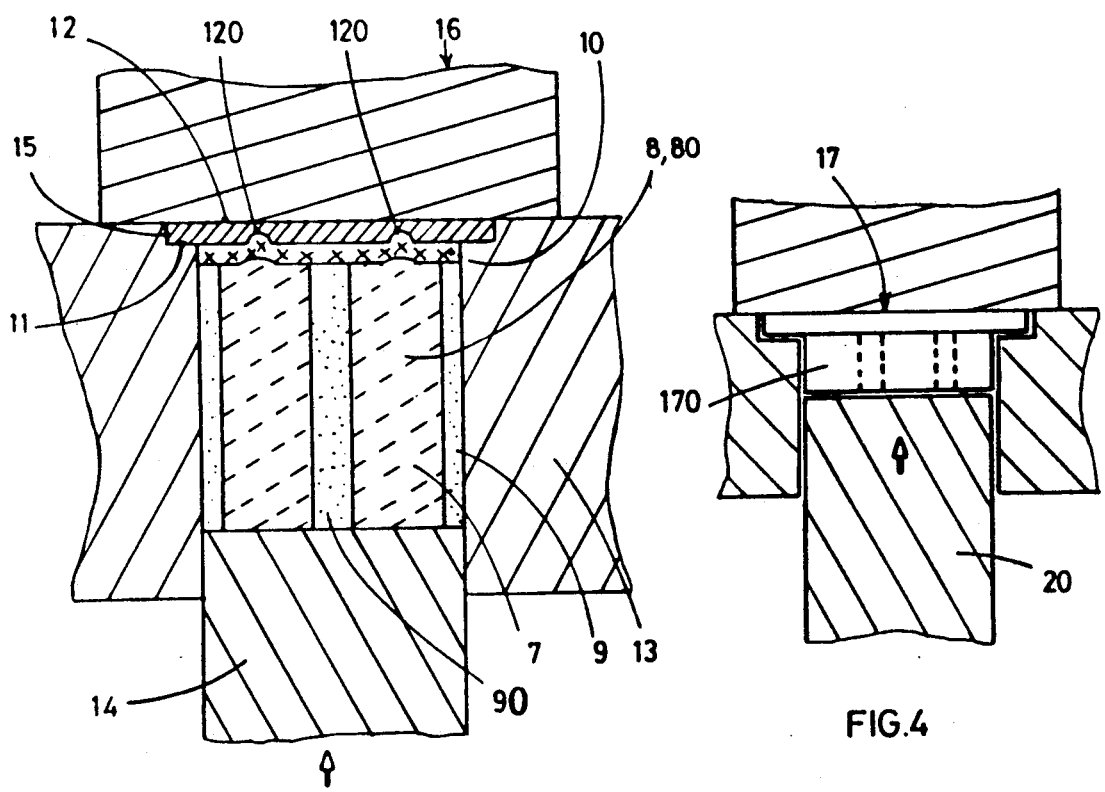
FIG.2
FIG.4

MULTI-STUD BRAKE FITTING

BACKGROUND OF THE INVENTION

The invention relates to a method of manufacturing a brake fitting based on bronze or iron and comprising a number of studs secured to a metal support. It also relates to the resulting fittings.

Known fittings delivered by the Applicant comprise separate studs secured to their metal support. Each stud has a cylindrical casing made of a less fragile sintered metal product and adapted to protect the friction product and prevent notching.

Owing to the number of manufacturing operations, it is complicated and expensive to manufacture the studs one by one. The studs are secured individually, which is a disadvantage as regards the control of the overall rigidity of the fittings. The Applicants have tried to develop a method of manufacture which is simpler and results in more durable brake fittings.

SUMMARY OF THE INVENTION

The invention relates firstly to a method of manufacturing brake fittings in which, in known manner, a number of studs made of sintered friction products, each laterally sheathed by a less fragile metal sintered bead, are secured to a metal support, generally of sheet metal. The steps according to the invention are as follows:

(a) one surface of the metal support is coated with a braze-welding suspension which is oxidize and then reduced, thus obtaining a slip resistant surface;

(b) a mixture of powders of friction products is shaped and edged and divided into a number of blank portions for the studs by beads of metal powders which are blanks of the less fragile sintered beads;

(c) the mixture of powders is compressed and pressed against the slip resistant surface of the metal support, thus obtaining an assembly;

(d) the grains of powder in the assembly are bonded to one another and welded to the metal support by heat-treatment of the assembly in a reducing atmosphere;

(e) the resulting sintered, welded component is forged at above 400° C., thus reducing the height of the sintered powder mixture by at least 15%, and (f) grooves are made in the beads so as to divide the mixture into separate sintered studs laterally sheathed around their entire periphery by the beads, the grooves leaving a covering layer of at least 0.5 mm relative to the metal substrate in order to adjust the rigidity of the resulting brake fittings.

Operations (b) and (c) in combination can surprisingly simplify operations (d) and (e), since the stud powders are compressed in a single operation and the compressed material sticks to the treated metal support so that it can be handled without risk of slipping before reaching the heat-treatment means for sintering the grains and finally welding them to the support. Hot forging, for compacting the future studs, is then carried out in one operation, and grooves are formed in the metal powder beads and divide the mixture of friction products, leaving a covering layer of more than 0.5 mm, normally between 0.5 and 8 mm, above the metal support, so that the studs have a common base, the thickness of which can be chosen to adjust the rigidity of the brake fitting and of its studs.

The coating treatment of the metal support surface by braze-welding is particularly important with regard to the behaviour of the mixture of powders in the compression and heat-treatment operations. After conventional operations of degreasing and/or sanding a surface of the substrate, which is generally of steel, it is coated, e.g. by means of a spray gun, with braze-welding powder in suspension in an organic binder such as collodion and in an organic solvent such as acetone;

next, the binders are completely oxidized, normally between 300° C. and 550° C., to eliminate traces of carbon or soot produced by sintering and welding;

next, the oxides are reduced by treatment in a reducing atmosphere between 600° C. and 1000° C., normally 750° to 950° C., thus diffusion bonding the grains of braze-welding powder to the metal support.

The thus-treated surface has good adhesion and is ready for welding to the grains of powdered friction products and of the metal powders of the beads.

This good adhesion results in flexibility in the implementation of steps (c) and (d):

the powders can be shaped in a mold separate from the substrate, the friction products being partitioned by the metal bead products through use of compartmented loading means;

compression can then be brought about separately or on the support sheet. Compression on the treated support sheet is preferred since it gives better adhesion, so that the compressed assembly does not slip even when the metal sheet slopes by more than 15°;

it is far preferable to shape the powders by compression directly on the support sheet. In that case it is particularly advantageous to add a sub-layer of bronze powder to the lining-substrate interface, thus obtaining a thickness of 0.1 to 2 mm at the end of manufacture, i.e. normally 0.2 to 3 mm during shaping, thus improving the welded connection between the support and the studs.

The heat-treatment and sintering and welding followed by hot forging are then carried out on all the powdered friction products and the less fragile sheathing-bead blank metal powders forming the future studs, depending mainly on the nature of these products, whether based on bronze or iron.

In the case where the friction product powders contain powdered graphite and abrasive products and fluxes such as lead or glass bonded by bronze, and the less fragile bead-blank metal powders contain bronze, cast-iron and 0.4 to 10% graphite, the sintering and welding heat treatment in step (d) is carried out between 750° and 1000° C. for 15 to 40 minutes, and the hot forging in step (e) is at a temperature between 400° and 950° C. In the case where the friction product powders contain powdered graphite and abrasive products and fluxes such as lead or glass bonded by iron, and the less fragile bead-blank metal powders contain iron, cast metal and 0.4 to 10% graphite, the sintering and welding heat treatment in step (d) is carried out between 850° and 1130° C., and the hot forging in step (e) is at a temperature between 600° and 1050° C.

A considerable improvement in the bond between the sintered forged grains can then be made by isostatic compression treatment at at least 750° C. after hot forging. This treatment multiplies the life of the brake linings according to the invention by 1.2 to 3. Practical implementation thereof will be described in the examples.

The invention also relates to the corresponding brake fittings characterised in that the friction studs sheathed by a less fragile metal bead are separated by spaces, each leaving a covering layer having an excess thickness of at least 0.5 mm relative to the metal support.

Preferably the fittings have a thin (0.1 to 2 mm sublayer of bronze just above the substrate, improving the strength of the welded connection between the substrate and studs.

The invention presents the following advantages:
- Manufacture is greatly simplified by the one-piece construction of the sintered material and because the brake lining blank is conveyed and presented for sintering and welding heat-treatment in a single assembly.
- The rigidity, which determines the performance in operation, can be controlled by the choice of the depth of the grooves between studs.
- The service life is also increased, typically by 30 to 100%, by additional hot isostatic compression treatment.

BRIEF DESCRIPTION OF THE DRAWINGS

FIG. 1 shows a prior-art brake fitting in elevation.

FIG. 1b is a plan view of the same fitting.

FIG. 2 shows a device and operation for shaping and compressing an assembly of powders according to the invention directly on to a metal substrate, in longitudinal section through a line of stud blanks;

FIG. 3 shows the resulting blank component, sloping and in elevation;

FIG. 4 shows a device and operation for hot-forging the heat-treated blank component, the tools being shown in longitudinal section only;

DESCRIPTION OF THE PREFERRED EMBODIMENTS

Figure 5A:
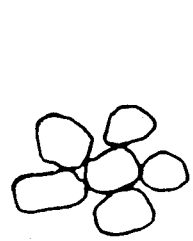
FIGS. 5a to 5d diagrammatically show the effect of successive treatments on the bronze between the grains of powders.

FIGS. 1 and 1b show a prior-art fittings 1 comprising six substantially square studs 2 secured by welding 3 to a metal support 4, the spaces 5 between studs 2 being obtained when they are positioned and individually secured. Support 4 is in turn secured to an assembling component 6 in a braking device.

FIG. 2 shows a device comprising a cavity 7 for shaping or moulding a mixture of powders which, to use short names, comprises "friction powder" 8 and portions of "bead powders" 9 and 90 which surround and divide the friction powders 8 into portions 80. The intermediate powder portions 90 are two to three times as large as the outer portions 9, and are axially grooved, e.g. with a metal-slitting saw, at the end of manufacture so as to leave a bead. The mixture of powders 8, 9 and 90 is surmounted by a sub-layer 10 of bronze powder having a thickness corresponding to a final thickness of 0.5 mm and directly in contact with the surface 11, coated by braze-welding, of a metal support 12.

The cavity 7 is bounded by a die 13 and its base is closed by a punch 14 at the bottom. Powders 8, 9 and 10 are first poured in by a compartmented block, shoe or the like, after which the cavity 7 is covered by substrate 12 which is placed in a recess 15, and then by an upper punch 16 for securing the support or metal sheet 12, which if required is formed with anchoring holes 120, the cavity also being bounded by die 13 when the bottom punch 14 rises in order to compress the powders against the support 12 and the anchoring holes 120, if present.

The cold compression compacts the powders and simultaneously sticks them firmly to the support or bed 12, so that they can safely travel towards the sintering and welding heat-treatment.

FIG. 3 shows a blank 17 shaped and compressed in the aforementioned manner and sloping, the slope being indicated by the angle 18 between support 12 and the horizontal. In this case it was possible to slope the blanks by 20° without detectable slipping of the mixture of compressed powders 19 with respect to the substrate 12. This shows the advantage of the good adhesion obtained by the coated surface 11 of support 12, and indicates that these fittings are suitable for industrial manufacture.

FIG. 4 represents forging at 800° C. of a blank 17 which has already been sintered and welded, the friction and bead powders being based on bronze. The sintered mixture 170 is forged with a mobile punch 20, thus reducing the height of the powder mixture by 15% to 35% (25% in this case) in order to compact it.

As can be seen, the compactness is improved and the grains interlock (FIG. 5c), thus increasing the strength in operation.

Figure 5B:
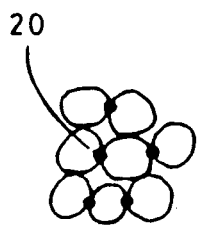
Figure 5C:
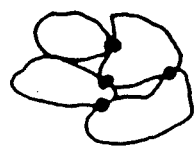
Figure 5D:
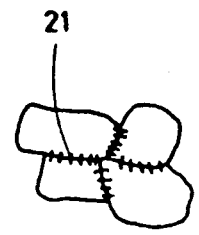
Figure 6:
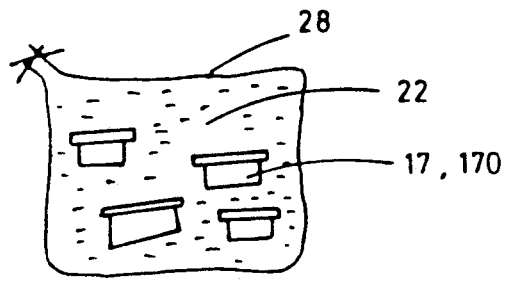
FIG. 6 shows the components in an isostatic compression container, in partial section.
Figure 7:
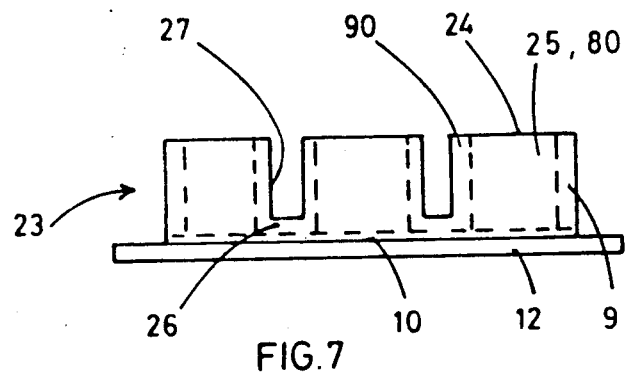
FIG. 7 shows an embodiment of the brake fittings according to the invention.

Four steps in manufacture are shown in FIGS. 5a to 5d:

FIG. 5a: powder grains after shaping ("molding");

FIG. 5b: after sintering, metallurgical joins 20 at the places of contact between grains;

FIG. 5c: after hot forging, compaction with deformation of grains and interlocking;

FIG. 5d: after hot isostatic compression, cohesion and generalised metallurgical bonds 21. Considerable increase in mechanical strength and service life.

Practical implementation of hot isostatic compression:

The forged blanks 17 are immersed in a bed of refractory particles 22 placed in a heat-deformable sealing-tight container 28 sealed in vacuo. In the present case, container 28 is of steel. After being filled, evacuated and closed in sealing-tight manner, it is treated at a pressure normally between 5 and 25 MPa and at a temperature normally between 700° and 940° C. in the case of "bronze base", or 850° C. to 1050° C. in the case of "iron base" for at least 10 minutes. The blanks 17 are cooled and extracted, with the result that the sintered, forged mixture 170, which has now been isostatically compressed, has metallurgical bonds such as 21 (FIG. 5d), with a surprising improvement in strength during operation.

The resulting brake fittings

The drawing shows fitting 23 which, via the end faces 24 of its studs such as 25, is pressed against a mobile wheel disc of a railway vehicle to be braked. Each stud 25, round its entire periphery, has a less fragile metal bead 9, 90 which sheathes and protects the friction product 80.

Studs 25 are secured together by their base 26, which projects above the metal substrate 12 by 3 mm at the spaces or grooves 27. The base 26 comprises a sublayer 10 of sintered bronze 0.5 mm thick and situated directly above the rigid sheet 12 and bringing about particularly strong continous welding between the sheet 12 and the sintered material 26 and 25.

The brake lining according to the invention is used for very reliable braking of railway or motor vehicles, the brakes acting on the wheel discs or flanges or times. The invention is also of use for aircraft or helicopters and industrial machines.

What is claimed is:

1. A brake fitting comprising:
    a plurality of studs separated from each other by spaces, each said stud being made of a sintered friction product and being laterally sheathed by a less fragile sintered metal bead; and
    a metal support having a surface on which said studs are fixed;
    wherein said surface of the metal support is coated by grains of braze-welding powder which are diffusion bonded thereto, said studs being continuously welded at base portions thereof to said coated metal support surface,
    and wherein said less fragile sintered metal bead extends into the spaces between the studs, covering the coated metal support to a depth of at least about 0.5 mm.

2. A brake fitting according to claim 1, additionally comprising a sintered bronze layer 0.1 to 2 mm thick directed welded to said coated support, and interposed between the sheathed studs and the coated support.

3. A brake fitting according to claim 1 or 2, wherein the spaces separating the studs are produced by grooving with a metal slitting saw which leaves a continuous less fragile sintered metal bead around each stud and covering said coated metal support.

4. A brake fitting according to claim 3, wherein the spaces axially divide said less fragile sintered beads of said studs, the grooving operations producing them being performed with a metal-slitting saw.

5. A brake fitting according to claim 1, or 2, wherein the sintered friction product of each stud contains graphite and abrasive products bonded by bronze, the less fragile sintered bead sheathing said stud containing bronze and cast iron and 0.4 to 10% graphite.

6. A brake fitting according to claim 1, or 2, wherein the sintered friction product of each stud contains graphite and abrasive products bonded by iron, the less fragile sintered bead sheathing said stud containing iron and cast iron and 0.4 to 10% graphite.

7. A brake lining according to claim 1, wherein said sheathed studs are formed by machining a continuous network of less fragile sintered metal bead.

8. A brake fitting comprising a plurality of studs separated from each other by spaces and made of sheathed sintered friction products, each said stud laterally secured by a less fragile metal sintered bead onto a surface of a metal support, produced by a process comprising the steps of:
    (a) coating one surface of a metal support with a braze-welding suspension which is oxidized and then reduced, thus obtaining a slip-resistant surface;
    (b) shaping a mixture of powder grains of friction products, and edging and dividing the shaped mixture into a number of blank portions for the studs by beads of metal powders which are blanks of less fragile sintered beads;
    (c) compressing the mixture of shaped and divided powder grains and pressing against the slip-resistant surface of the metal support, thus obtaining an assembly;
    (d) bonding the grains of powder in the assembly to one another and welding to the metal support by heat-treating the assembly in a reducing atmosphere;
    (e) forging the resulting sintered, welded component at above 400° C., thus reducing the height of the sintered powder mixture by at least 15%, and
    (f) forming grooves in the beads so as to divide the sintered welded mixture into separate sintered studs laterally sheathed by beads, the grooves leaving a covering layer of at least 0.5 mm relative to the metal support in order to adjust the rigidity of the resulting brake fitting.

* * * * *